United States Patent
Harnetiaux

(10) Patent No.: US 8,047,147 B2
(45) Date of Patent: Nov. 1, 2011

(54) COULTER ASSEMBLY

(75) Inventor: Travis Harnetiaux, Bourbonnais, IL (US)

(73) Assignee: CNH America LLC, New Holland, PA (US)

( * ) Notice: Subject to any disclaimer, the term of this patent is extended or adjusted under 35 U.S.C. 154(b) by 62 days.

(21) Appl. No.: 12/474,408

(22) Filed: May 29, 2009

(65) Prior Publication Data
US 2010/0300340 A1 Dec. 2, 2010

(51) Int. Cl.
A01B 5/00 (2006.01)
A01B 7/00 (2006.01)
A01B 15/16 (2006.01)
A01B 21/00 (2006.01)
A01C 5/00 (2006.01)

(52) U.S. Cl. ......... 111/167; 111/926; 172/536; 172/602

(58) Field of Classification Search .................. 172/519, 172/536, 538, 430, 602; 111/135, 137, 140, 111/163–165, 167, 192, 193, 926
See application file for complete search history.

(56) References Cited

U.S. PATENT DOCUMENTS

| 0,224,813 | A |   | 2/1880  | Blair              |         |
|-----------|---|---|---------|--------------------|---------|
| 0,517,231 | A |   | 3/1894  | Norton             |         |
| 1,252,627 | A |   | 1/1918  | Stack              |         |
| 1,277,016 | A |   | 8/1918  | Windham            |         |
| 1,412,615 | A |   | 4/1922  | Johnson            |         |
| 2,129,453 | A |   | 9/1938  | Van Sickle         |         |
| 2,493,649 | A |   | 1/1950  | Alloway            |         |
| 2,816,783 | A |   | 12/1957 | Robertson          |         |
| 4,408,551 | A | * | 10/1983 | Keller et al.      | 111/163 |
| 4,580,506 | A |   | 4/1986  | Fleischer et al.   |         |
| 4,723,495 | A |   | 2/1988  | Dietrich, Sr. et al. |       |
| 4,760,806 | A | * | 8/1988  | Bigbee et al.      | 111/167 |
| 5,337,832 | A |   | 8/1994  | Bassett            |         |
| 5,887,664 | A |   | 3/1999  | Whalen et al.      |         |

FOREIGN PATENT DOCUMENTS

EP 0352865 1/1990

* cited by examiner

Primary Examiner — Christopher J. Novosad
(74) Attorney, Agent, or Firm — Rebecca Henkel

(57) ABSTRACT

A coulter assembly is provided that facilitates continuous adjustment of coulter disk penetration depth. In an exemplary embodiment, the coulter assembly includes a gauge wheel configured to rotate across a soil surface to limit a penetration depth of a coulter disk into the soil. A depth adjustment assembly is coupled to the gauge wheel and configured to adjust the penetration depth of the coulter disk by continuously varying the vertical position of the gauge wheel. This configuration may enable the coulter disk to operate at any penetration depth within the gauge wheel range of motion, thereby facilitating deposition of fertilizer within the soil at a suitable depth to enhance crop growth.

6 Claims, 6 Drawing Sheets

COULTER ASSEMBLY

BACKGROUND

The invention relates generally to a coulter assembly, and more specifically, to a continuously variable depth adjustment system for altering a coulter disk penetration depth.

Generally, coulters are towed behind a tractor via a mounting bracket secured to a rigid frame of the implement. Coulters are typically configured to excavate a trench into soil, and may assist in delivering a liquid or dry fertilizer into the trench. Specifically, certain coulters include a coulter disk that cuts into the soil as the coulter moves along the terrain. A penetration depth of the coulter disk is generally regulated by a gauge wheel. In a typical configuration, the gauge wheel is positioned adjacent to the coulter disk and rotates across the soil surface. The coulter disk is positioned below the gauge wheel such that the coulter disk penetrates the soil. A vertical offset distance between the coulter disk and the gauge wheel determines the coulter disk penetration depth. As will be appreciated by those skilled in the art, the effectiveness of fertilizer may be dependent upon its deposition depth within the soil. Therefore, precise control of coulter disk penetration depth may be beneficial for crop growth.

However, typical coulter assemblies only facilitate gauge wheel adjustment in discrete increments. For example, the gauge wheel may only be adjusted between two or three discrete positions. As a result, the coulter may not deposit the fertilizer at a suitable depth to enhance crop growth.

BRIEF DESCRIPTION

The present invention provides a coulter assembly configured to facilitate continuous adjustment of coulter disk penetration depth. In an exemplary embodiment, the coulter assembly includes a support structure and a coulter disk rotatable coupled to the support structure. A gauge wheel is movably coupled to the support structure and configured to rotate across a surface of the soil to limit a penetration depth of the coulter disk into the soil. A depth adjustment assembly is coupled to the gauge wheel and configured to adjust the penetration depth of the coulter disk by continuously varying the vertical position of the gauge wheel. This configuration enables any coulter disk penetration depth to be selected within the gauge wheel range of motion, thereby facilitating deposition of fertilizer within the soil at a suitable depth to enhance crop growth.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
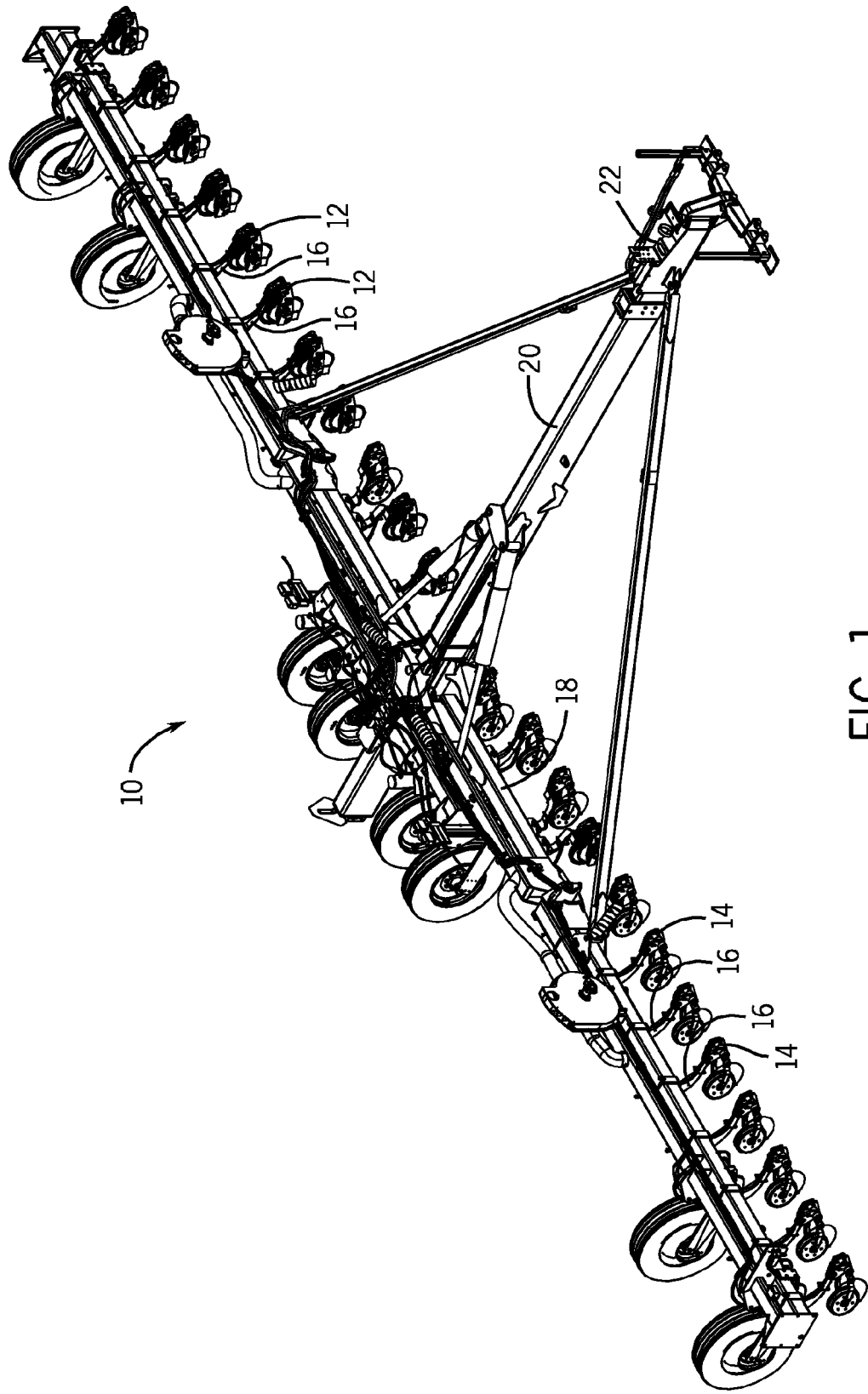
FIG. 1 is a perspective view of a towable agricultural implement including multiple coulter assemblies.

Turning now to the drawings, FIG. 1 is a perspective view of a towable agricultural implement 10 including multiple left-handed coulter assemblies 12 and right-handed coulter assemblies 14. As discussed in detail below, the coulter assemblies 12 and 14 may include a coulter disk configured to excavate a trench into soil. A fertilizer delivery assembly positioned behind the coulter disk may then inject a liquid or dry fertilizer into the trench. In such an arrangement, seeds planted adjacent to the trench may receive a proper amount of fertilizer. As illustrated, the coulter assemblies 12 and 14 are secured to shanks 16 that couple the coulter assemblies 12 and 14 to a tool bar 18. In the present embodiment, the tool bar 18 includes 12 left-handed coulter assemblies 12 and 12 right-handed coulter assemblies 14. Further embodiments may include more or fewer coulter assemblies 12 and 14. For example, certain embodiments may include 2, 4, 6, 8, 10, 14, 16, or more left-handed coulter assemblies 12 and right-handed coulter assemblies 14. The tool bar 18 is coupled to a tow bar 20, including a hitch 22. The hitch 22 may, in turn, be coupled to a tractor such that the towable agricultural implement 10 may be pulled through a field. In certain embodiments, the tool bar 18, including the coulter assemblies 12 and 14, precedes row units configured to deposits seeds into the soil. In such embodiments, the row units may be offset from the coulter assemblies 12 and 14 such that the seeds are deposited a desired distance from the fertilizer enriched trench. This configuration may enable the crops to absorb a proper amount of fertilizer as they grow.

As discussed in detail below, a penetration depth of each coulter disk may be varied by adjusting a vertical position of a gauge wheel. Specifically, the gauge wheel may rotate across a surface of the soil to limit coulter disk penetration. Increasing or decreasing the vertical position of the gauge wheel with respect to the coulter disk varies the penetration depth. In the present embodiment, a depth adjustment assembly is coupled to the gauge wheel to continuously vary its vertical position. Therefore, any coulter disk penetration depth within the gauge wheel range of motion may be selected.

Figure 2:
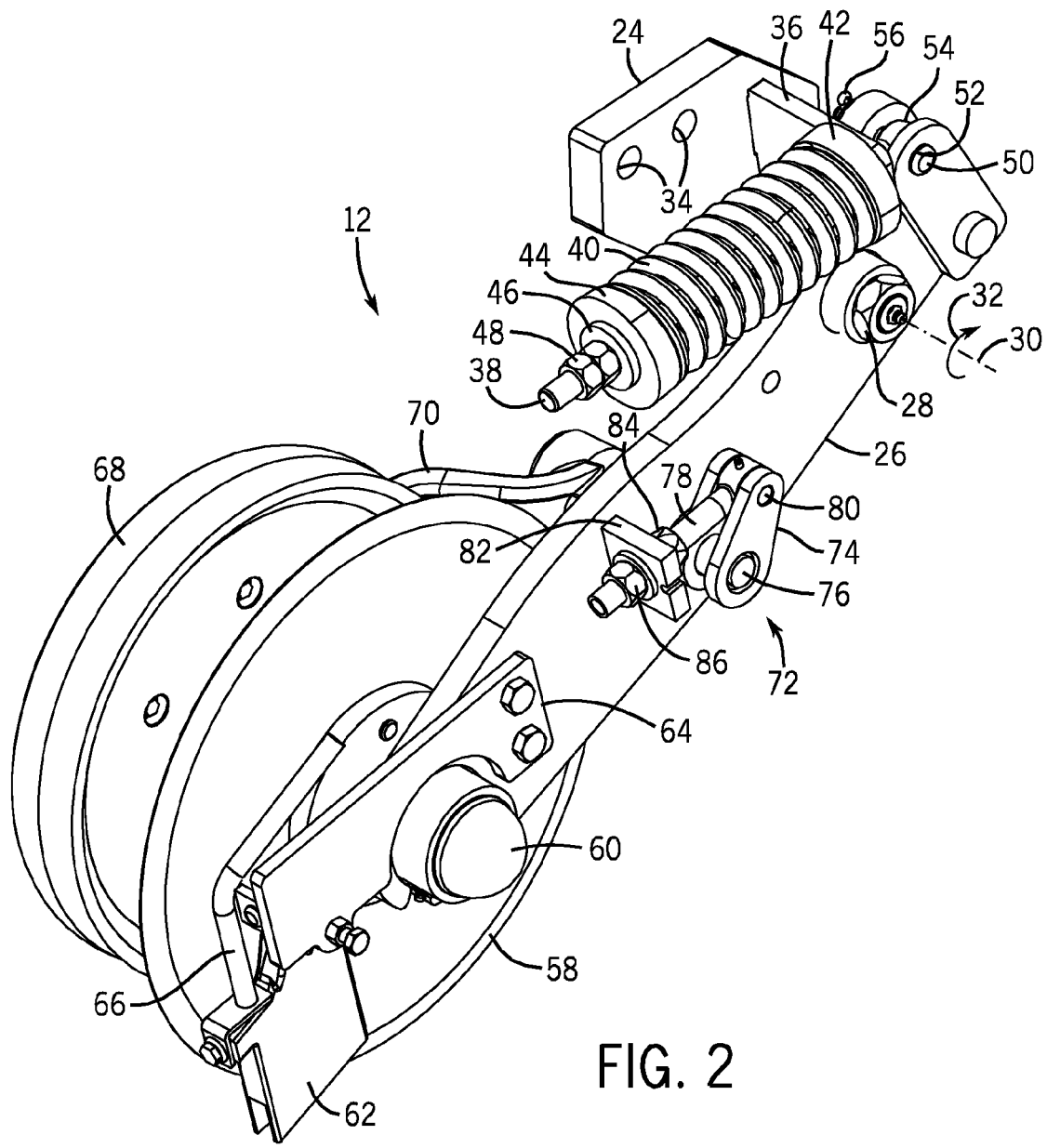
FIG. 2 is a detailed perspective view of one coulter assembly, as shown in FIG. 1.

FIG. 2 is a detailed perspective view of a left-handed coulter assembly 12. The coulter assembly 12 is coupled to the shank 16 by a tool bar mount 24. As illustrated, the tool bar mount 24 is rotatably coupled to a support structure 26 by a shaft 28. The shaft 28 enables the support structure 26 to rotate about an axis 30 in a direction 32 in response to obstructions or variations in the terrain. Specifically, the tool bar mount 24 may be coupled to the shank 16 by fasteners that pass through openings 34 in the tool bar mount 24. The tool bar mount 24 includes a spring plate 36 configured to limit rotation of the support structure 26 with respect to the tool bar mount 24. The coulter assembly 12 includes a threaded rod 38 and a compression spring 40 configured to maintain a substantially constant force between the gauge wheel and the soil. Specifically, the threaded rod 38 passes through an opening in the spring plate 36, and the spring 40 is disposed about the threaded rod 38. A first spring stop 42 is disposed between the spring 40 and the spring plate 36, and a second spring stop 44 is disposed adjacent to the opposite end of the spring 40 to ensure that the spring 40 remains disposed about the threaded rod 38. The second spring stop 44 is secured to the spring 40 by a washer 46 and a pair of fasteners 48. The threaded rod 38 is coupled to a pin 50 that passes through a hole 52 in the support structure 26. The pin 50 is secured to the threaded rod 38 by a loop 54 and the support structure 26 by a cotter pin 56.

The structure described above enables the support structure 26 to rotate about the axis 30 in the direction 32 in response to variations in field conditions. For example, if the support structure 26 is driven to rotate in the direction 32 by contact with an obstruction, the support structure 26 may rotate about the shaft 28. As the support structure 26 rotates, the spring 40 is compressed, thereby biasing the support structure 26 toward its initial orientation. Specifically, rotation of the support structure 26 causes the pin 50 to rotate about the axis 30 in the direction 32. Because the pin 50 is coupled to the threaded rod 38 by the loop 54, the threaded rod 38 is driven to translate through the opening in the spring plate 36. The spring 40 is then compressed between the spring stops 42 and 44 by the washer 46 secured to the threaded rod 38 by the fasteners 48. The spring compression applies a biasing force to the support structure 26 by the previously described linkage, thereby inducing the support structure 26 to return to its initial orientation. Such a configuration may serve to protect the coulter assembly 12 by absorbing the impact of obstructions encountered during cultivation.

The coulter assembly 12 also includes a coulter disk 58 rotatably coupled to the support structure 26 by a bearing assembly 60. The bearing assembly 60 enables the coulter disk 58 to freely rotate as it engages the soil and excavates a trench. The coulter assembly 12 also includes a scraper 62 disposed adjacent to the coulter disk 58 and coupled to the support structure 26 by a bracket 64. The scraper 62 is configured to remove accumulated soil from the coulter disk 58 and may serve to widen the trench. The scraper 62 is coupled to a fertilizer tube 66 configured to deliver liquid or dry fertilizer into the trench.

A gauge wheel 68 is pivotally coupled to the support structure 26 by a swing arm 70. The swing arm 70 is, in turn, coupled to a depth adjustment assembly 72 configured to continuously vary the vertical position of the gauge wheel 68 with respect to the support structure 26. As discussed in detail below, because the gauge wheel 68 travels along the surface of the soil, varying the position of the gauge wheel 68 alters the penetration depth of the coulter disk 58 into the soil. The depth adjustment assembly 72 includes a lever 74 and a shaft 76. The shaft 76 is rigidly coupled to a first end of the lever 74, and a linear actuator is coupled to the second end. In this configuration, extension and retraction of the linear actuator induces the lever 74 and the shaft 76 to rotate. In certain embodiments, the linear actuator may include a pneumatic cylinder, a hydraulic cylinder, or an electromechanical actuator, for example. In the present embodiment, the linear actuator includes a rod 78, a pin 80, a mount 82, a first fastener 84 and a second fastener 86. As discussed in detail below, adjusting the position of the fasteners 84 and 86 with respect to the rod 78 rotates the lever 74, thereby rotating the shaft 76 coupled to the swing arm 70. Rotating the swing arm 70 alters the vertical position of the gauge wheel 68, thereby varying the penetration depth of the coulter disk 58. Because the fasteners 84 and 86 may be positioned at any location along the length of the rod 78, extension and/or retraction of the rod 78 with respect to the mount 82 may be continuously varied. Therefore, any coulter disk penetration depth within a range defined by the length of the rod 78 and the geometry of the depth adjustment assembly 72 may be achieved.

Figure 3:
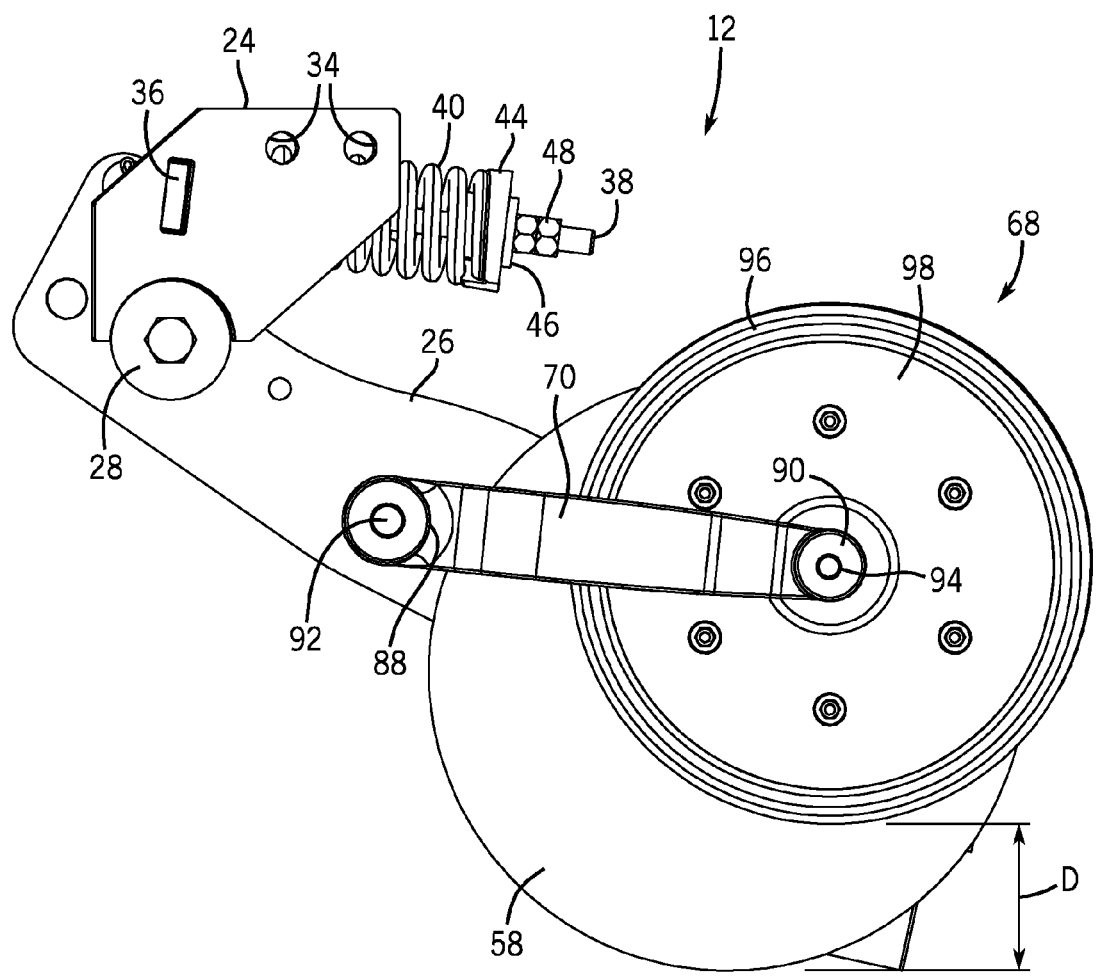
FIG. 3 is a left side view of the coulter assembly of FIG. 2, showing a support structure, a coulter disk, a gauge wheel, and a swing arm.

FIG. 3 is a left side view of the coulter assembly 12, showing the support structure 26, the coulter disk 58, the gauge wheel 68, and the swing arm 70. As previously discussed, the depth adjustment assembly 72 may rotate the swing arm 70, thereby adjusting the vertical position of the gauge wheel 68. Specifically, the swing arm 70 includes a first region 88 and a second region 90. The first region is rigidly coupled to the shaft 76 by a bolt 92. In this manner, rotation of the shaft 76 induces the swing arm 70 to rotate. In addition, the gauge wheel 68 is rotatably coupled to the second region 90 by a bolt 94. The bolt 94 enables the gauge wheel 68 to rotate as it moves across the soil surface.

In the illustrated embodiment, the gauge wheel 68 includes an outer surface 96 and an inner hub 98. The outer surface 96 may be composed of rubber to provide traction between the gauge wheel 68 and the soil. The inner hub 98 may be composed of a rigid material (e.g., nylon) capable of supporting the outer surface 96. As illustrated, a penetration depth D is established between the bottom of the gauge wheel 68 and the bottom of the coulter disk 58. Specifically, because the gauge wheel 68 rotates along the surface of the soil, the coulter disk 58 may penetrate the soil to the penetration depth D. In addition, because the depth adjustment assembly 72 is configured to lock the swing arm 70 into place during operation of the coulter assembly 12, the gauge wheel 68 may limit the penetration depth D based on the angle of the swing arm 70. Moreover, because the depth adjustment assembly 72 is configured to continuously vary the angle of the swing arm 70 with respect to the support structure 26, the depth adjustment assembly 72 may continuously vary the penetration depth D of the coulter disk 58 into the soil.

In the present embodiment, the gauge wheel 68 is disposed directly adjacent to the coulter disk 58. In this configuration, the gauge wheel 68 may serve to remove accumulated soil from the coulter disk 58 as the gauge wheel 68 rotates. In certain embodiments, the gauge wheel 68 is angled about a longitudinal axis of the support structure 26 toward a soil penetrating portion of the coulter disk 58. This arrangement may serve to enhance soil removal from the coulter disk 58.

Figure 4:
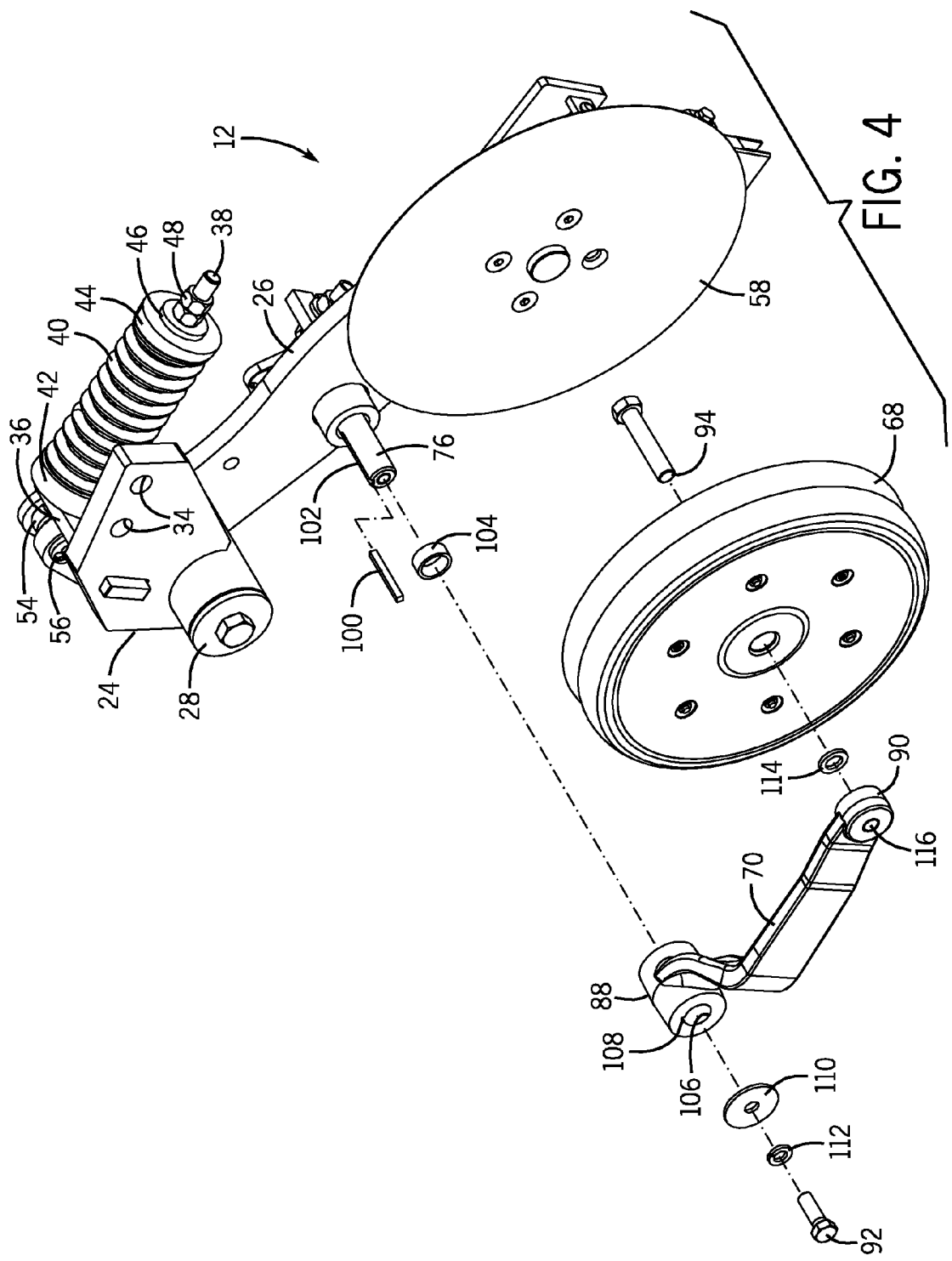
FIG. 4 is an exploded view of the coulter assembly of FIG. 2, showing the support structure, the coulter disk, the gauge wheel, and the swing arm.

FIG. 4 is an exploded view of the coulter assembly 12, showing the support structure 26, the coulter disk 58, the gauge wheel 68, and the swing arm 70. Specifically, FIG. 4 illustrates the internal parts that enable the swing arm 70 to rotate with respect to the support structure 26. As previously discussed, the swing arm 70 is rigidly coupled to the shaft 76. To limit rotation of the swing arm 70 with respect to the shaft 76, a key 100 is inserted into a recess 102 in the shaft 76. A bearing 104 is then disposed between the shaft 76 and the support structure 26 to enable the shaft 76 to rotate within the support structure 26. The first region 88 of the swing arm 70 includes an opening 106 including a recess 108 configured to interlock with the key 100. Specifically, the recess 108 is aligned with the key 100 prior to disposing the opening 106 about the shaft 76. Interaction between the key 100 and the recess 108 limits rotation of the swing arm 70 with respect to the shaft 76. Therefore, rotation of the shaft 76 by the depth adjustment assembly 72 rotates the swing arm 70, while limiting rotation of the swing arm 70 during operation of the coulter assembly 12. Finally, the swing arm 70 is secured to the shaft 76 by the bolt 92 and washers 110 and 112.

As previously discussed, the gauge wheel 68 is coupled to the second region 90 of the swing arm 70 by the bolt 94. Specifically, the bolt 94 passes through the gauge wheel 68 and a washer 114. The bolt 94 then secures to an opening 116 within the second region 90 of the swing arm 70. This configuration enables the gauge wheel 68 to rotate with respect to the swing arm 70 as it moves across the soil surface.

Figure 5:
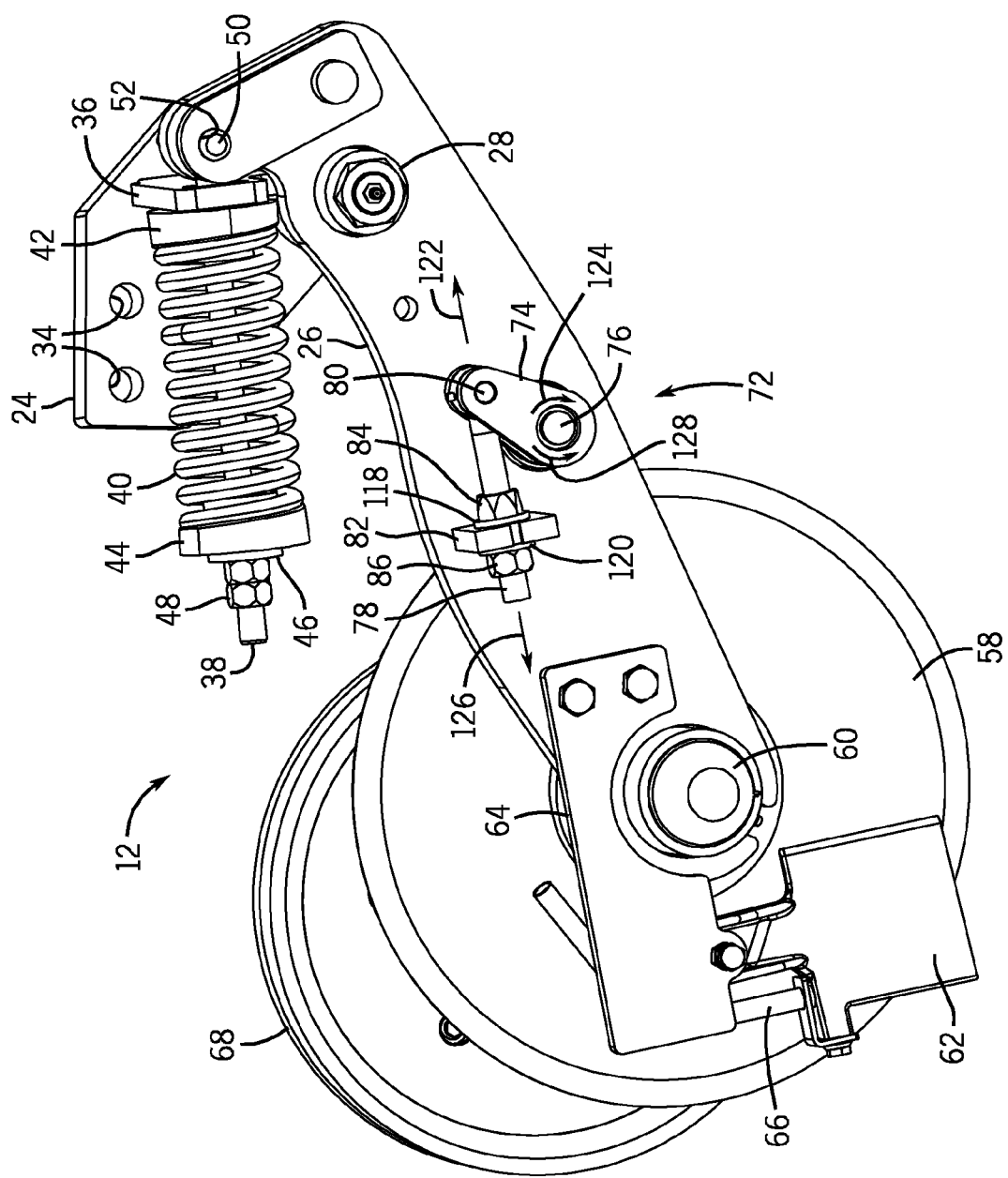
FIG. 5 is a right side view of the coulter assembly of FIG. 2, showing the support structure and a depth adjustment assembly.

FIG. 5 is a right side view of the coulter assembly 12, showing the support structure 26 and the depth adjustment assembly 72. As previously discussed, the depth adjustment assembly 72 facilitates continuous adjustment of the penetration depth D of the coulter disk 58 into the soil by adjusting the vertical position of the gauge wheel 68. Specifically, a position of the rod 78 may be varied by adjusting the position of the fasteners 84 and 86 with respect to the mount 82. In certain embodiments, the rod 78 may be threaded and the fasteners 84 and 86 may be nuts including complementary threads configured to mate with the threaded rod 78. In such a configuration, washers 118 and 120 may be disposed between the nuts 84 and 86, respectively, and the mount 82. For example, the rod 78 may be translated in a direction 122 by uncoupling the fastener 86, moving the rod 78 in the direction 122, and then securing both fasteners 84 and 86 about the mount 82. Translating the rod 78 in the direction 122 rotates the lever 74 in a direction 124, thereby rotating the shaft 76 in the direction 124. As previously discussed, the shaft 76 is rigidly coupled to the swing arm 70. Therefore, rotating the shaft 76 in the direction 124 induces the swing arm 70 to rotate in the direction 124, thereby increasing the vertical displacement of the gauge wheel 68 with respect to the support structure 26 and increasing the penetration depth D of the coulter disk 58.

Conversely, the rod 78 may be translated in a direction 126 by uncoupling the fastener 84, moving the rod 78 in the direction 126, and then securing both fasteners 84 and 86 about the mount 82. Translating the rod 78 in the direction 126 rotates the lever 74 in a direction 128, thereby rotating the shaft 76 in the direction 128. Because the shaft 76 is rigidly coupled to the swing arm 70, rotating the shaft 76 in the direction 128 induces the swing arm 70 to rotate in the direction 128. Therefore, the vertical displacement of the gauge wheel 68 with respect to the support structure 26 is decreased, and the penetration depth D of the coulter disk 58 is decreased. In certain embodiments, the penetration depth D of the coulter disk 58 may be continuously varied between approximately 0 to 6 inches. However, further embodiments may have a greater or lesser range of adjustment. Because the fasteners 84 and 86 may be positioned at any location along the rod 78, any penetration depth D may be established within the range limited by the length of the rod 78 and the geometry of the depth adjustment assembly 72.

Figure 6:
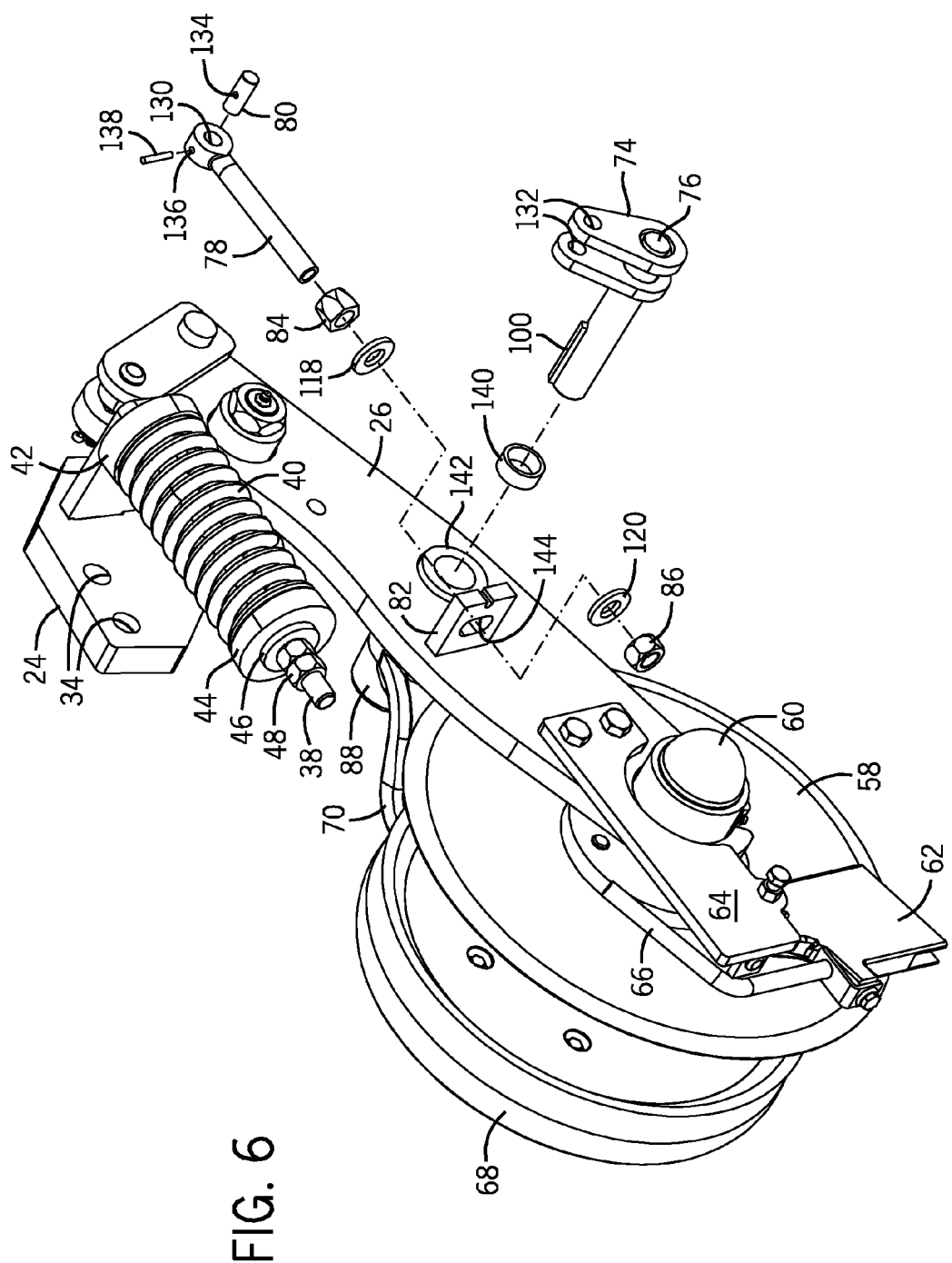
FIG. 6 is an exploded view of the coulter assembly of FIG. 2, showing the support structure and the depth adjustment assembly.

FIG. 6 is an exploded view of the coulter assembly 12, showing the support structure 26 and the depth adjustment assembly 72. As illustrated, the threaded rod 78 includes a loop 130 configured to receive the pin 80. The loop 130 of the threaded rod 78 may be aligned with openings 132 in the lever 74. The pin 80 may then be inserted through the openings 132 and the loop 130 to secure the threaded rod 78 to the lever 74. The pin 80 includes a recess 134, and the threaded rod 78 includes an opening 136. The recess 134 may be aligned with the opening 136, and a pin 138 may be inserted through the opening 136 and into the recess 134. In this manner, the threaded rod 78 may be rotatably secured to the lever 74.

As previously discussed, the lever 74 is rigidly coupled to the shaft 76 including the key 100. A bearing 140 is disposed about the shaft 76 such that the shaft 76 may rotate within an opening 142 within the support structure 26. This configuration may enable linear movement of the threaded rod 78 to induce rotation of the shaft 76 within the opening 142 such that the swing arm 70 rotates with respect to the support structure 26. The threaded rod 78 may be inserted through an opening 144 in the mount 82. As illustrated, the opening 144 is elongated in the vertical direction to enable vertical movement of the threaded rod 78 as the rod 78 translates in the direction 122 and/or 126 through the opening 144 in the mount 82. As previously discussed, fastener 84 and washer 118 is disposed on one side of the mount 82, while fastener 86 and washer 120 are disposed on the opposite side. In this configuration, the threaded rod 78 may be positioned and secured relative to the mount 82 such that the vertical position of the gauge wheel 68 may be continuously varied with respect to the support structure 26, thereby enabling the penetration depth D of the coulter disk 58 to be continuously adjusted.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A coulter assembly, comprising:
 a support structure;
 a coulter disk rotatably coupled to the support structure and configured to engage soil;
 a gauge wheel movably coupled to the support structure and configured to rotate across a surface of the soil to limit a penetration depth of the coulter disk into the soil; and
 a depth adjustment assembly coupled to the gauge wheel and configured to adjust the penetration depth of the coulter disk by adjusting a position of the gauge wheel relative to the support structure along a continuous range.

2. The coulter assembly of claim 1, wherein the gauge wheel is pivotally coupled to the support structure by a swing arm, and the depth adjustment assembly is configured to adjust an angle of the swing arm with respect to the support structure along a continuous range.

3. The coulter assembly of claim 2, wherein the depth adjustment assembly comprises a lever having a first end and a second end, the first end being rigidly coupled to the swing arm and the second end being rotatably coupled to a linear actuator, wherein extension and retraction of the linear actuator facilitates rotation of the swing arm with respect to the support structure.

4. The coulter assembly of claim 3, wherein the linear actuator comprises a mount coupled to the support structure, a rod disposed within an opening in the mount, a first fastener movably coupled to the rod and configured to block movement of the rod with respect to the mount in a first direction, and a second fastener movably coupled to the rod and configured to block movement of the rod with respect to the mount in a second direction, opposite the first direction.

5. The coulter assembly of claim 1, comprising a compression spring disposed between the support structure and a tool bar mount, and configured to maintain a substantially constant force between the gauge wheel and the soil.

6. The coulter assembly of claim 1, comprising a scraper disposed adjacent to the coulter disk and a fertilizer tube configured to deliver liquid or dry fertilizer into the soil.

* * * * *